United States Patent
Kimura et al.

(10) Patent No.: US 8,129,035 B2
(45) Date of Patent: Mar. 6, 2012

(54) STRUCTURAL COMPONENT FOR AUTOMOBILE, TWO-WHEELED VEHICLE OR RAILCAR EXCELLENT IN IMPACT-ABSORPTION PROPERTY, SHAPE FIXABILITY AND FLANGE CUTTABILITY, AND METHOD FOR PRODUCING THE SAME

(75) Inventors: Ken Kimura, Tokyo (JP); Junichi Hamada, Tokyo (JP); Naoto Ono, Tokyo (JP); Haruhiko Kajimura, Tokyo (JP); Toshio Tanoue, Tokyo (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 613 days.

(21) Appl. No.: 12/308,093

(22) PCT Filed: Apr. 1, 2008

(86) PCT No.: PCT/JP2008/056847
§ 371 (c)(1),
(2), (4) Date: Dec. 5, 2008

(87) PCT Pub. No.: WO2008/126815
PCT Pub. Date: Oct. 23, 2008

(65) Prior Publication Data
US 2009/0160217 A1    Jun. 25, 2009

(30) Foreign Application Priority Data

Apr. 10, 2007  (JP) ................................. 2007-102285
Feb. 28, 2008  (JP) ................................. 2008-046965

(51) Int. Cl.
  *B21D 47/00*    (2006.01)
  *B21K 7/00*     (2006.01)
  *B23P 17/04*    (2006.01)
  *B21C 1/00*     (2006.01)
  *B32B 3/00*     (2006.01)
  *B32B 3/24*     (2006.01)
  *B32B 3/28*     (2006.01)
  *B32B 3/30*     (2006.01)
  *B32B 15/01*    (2006.01)
  *B32B 15/18*    (2006.01)

(52) U.S. Cl. ........ 428/582; 428/544; 428/684; 428/685; 296/193.01; 296/203.01; 29/421.1; 29/897; 29/897.2

(58) Field of Classification Search .................. 428/582, 428/577, 578, 544, 615, 682, 683, 684, 685
See application file for complete search history.

(56) References Cited

U.S. PATENT DOCUMENTS

2006/0185774 A1*  8/2006  Nishibata et al. ............. 148/653
2007/0163685 A1*  7/2007  Kusumi et al. ................ 148/530

FOREIGN PATENT DOCUMENTS

JP    2001-130444 A    5/2001
JP    2004-114912 A    4/2004

* cited by examiner

*Primary Examiner* — Michael LaVilla
(74) *Attorney, Agent, or Firm* — Birch, Stewart, Kolasch & Birch, LLP

(57) ABSTRACT

The invention provides structural component for an automobile, two-wheeled vehicle or railcar excellent in impact-absorption property, shape fixability and flange cuttability, and method for producing the same, which structural component has a hat-like shape including vertical walls and flanges, wherein distal ends of the flanges contain 20 vol % or greater of austenite phase and have a cross-section hardness expressed as Vickers harness of 150~350, and a center regions of the vertical walls have, in a common cross-section with the flanges, a content of deformation-induced martensite phase exceeding that of the distal ends of the flanges by 10 vol % or greater and a cross-section hardness expressed as Vickers hardness that exceeds that of the distal ends of the flanges by 50 or greater.

4 Claims, 3 Drawing Sheets

(a)

(b)

(c)

STRUCTURAL COMPONENT FOR AUTOMOBILE, TWO-WHEELED VEHICLE OR RAILCAR EXCELLENT IN IMPACT-ABSORPTION PROPERTY, SHAPE FIXABILITY AND FLANGE CUTTABILITY, AND METHOD FOR PRODUCING THE SAME

FIELD OF THE INVENTION

This invention relates to a structural component for an automobile, two-wheeled vehicle or railcar excellent in impact-absorption property, shape fixability and flange cuttability, particularly to such a structural component for applications requiring strength and impact-absorbing capability, specific examples of which include passenger car, bus and other road vehicle impact-absorbing components, such as front-side members, pillars and bumpers, as well as suspension members, and railcar body members. The invention also relates to a method for producing such a structural component.

DESCRIPTION OF THE RELATED ART

Environmental concerns have in recent times made improvement of the fuel economy of passenger cars, motorcycles, buses, railcars and other means of transport a critical issue. One aggressively-pursued approach to boosting fuel economy has been car body weight reduction. Car body weight reduction relies heavily on lowering the weight of the materials used to fabricate the body components, specifically on reducing the thickness of the materials. However, material thickness reduction alone is apt to degrade collision (crash) safety performance.

Efforts are therefore being made to improve collision (crash) safety by increasing the strength of the materials constituting the structural members and high-strength steel sheet has come to be utilized in automobile impact-absorbing components. Available high-strength steel sheet products include ones given a multiphase microstructure such as DP (Dual Phase) steel and TRIP (TRansformation Induced Plasticity) steel. As set out at p 15 of the Transactions of the 228$^{th}$ Plasticity Symposium (2004) of The Japan Society for Technology of Plasticity, these types of steel have all been found to have impact-absorption property superior to solution-hardened steels and precipitation-hardened steels.

The aforesaid high-strength steel sheets are shaped into components by bending or drawing. However, the difficulty of obtaining the desired shape by such processing increases with increasing steel strength owing to large springback after shaping. This has been a major problem in the use of high-strength steel sheet. As set out in *Puresu Seikei Nan'i Handobukku* (Press Forming Difficulty Handbook), 2$^{nd}$ edition, published by Nikkan Kogyo Simbun, Ltd. (1997) p 208, an effective method of reducing springback is to increase additional tension. In the case of a high-strength steel sheet, however, the ductility of the material is insufficient, so that increasing the additional tension by raising the wrinkle suppressing force at the time of shaping may cause breakage in the course of shaping.

Flange cuttability has become another issue of interest in recent years. As termed with respect to this invention, "cuttability" indicates the cutting difficulty when the flange is cut to a predetermined shape after shaping. As the strength of structural components has risen, so has the strength of the flanges. Inferior flange cuttability has therefore become a problem because it shortens the service life of the blade used for the cutting and thus degrades productivity.

In a relatively recent advance, Japanese Patent Publication (A) No. 2001-130444 teaches use of a steel having austenite as its main phase to increase absorbed energy by utilizing deformation-induced martensite transformation during collision. Although this offers a means for achieving good crash absorption property, it is limited in its ability to achieve both good crash absorption property and good flange cuttability at the same time.

Thus, while progress is being made toward the development of high-strength materials that enable weight reduction, the use of high-strength materials raises its own issues (of shape fixability and cuttability). A need is felt for the development of structural components that offer a comprehensive solution to these issues.

SUMMARY OF THE INVENTION

The object of the present invention is to overcome the problem that when high-strength steel sheet is used as a material for a structural component offering excellent crash absorption property, the structural component is inferior in shape fixability and cuttability to one made with a conventional steel, and to provide a structural component for an automobile, two-wheeled vehicle or railcar that is excellent in impact-absorption property, shape fixability and flange cuttability, and further to provide a method for producing the structural component.

Using 0.8~4.0 mm thickness steel sheets of various chemical compositions comprising an austenite phase content of 20 vol % or greater and the balance of ferrite phase and/or martensite phase and unavoidable precipitated phases, the inventors carried out press-forming to obtain hat-shapes having a vertical wall height viewed in cross-section of 10~120 mm and an inter-flange distance (shortest distance between the left and right flanges) of 30~200 mm. All products were made to 300 and 600 mm lengths. The shapes were examined for change in impact-absorption property and shear property with vertical wall strength (hardness). Impact-absorption property was, for convenience, evaluated using an impact test piece fabricated so that plastic deformation of the test material with impact absorption during the impact absorption evaluation test would occur over the full longitudinal length of the test piece, i.e., so that buckling of the test material midway in the longitudinal direction would be prevented, namely fabricated by producing back sheets measuring 300 mm in length and having a width matched to the hat-shapes by the same production process as used for the hat-shapes, except for not pressing them into hat shapes, and overlaying a single line of the back sheets longitudinally on the flanges of each hat-shape piece and spot-welding them thereto at 20 mm intervals.

It should be noted that when the so-fabricated hat-shape is used as a structural component for an automobile, two-wheeled vehicle or railcar, it is not absolutely necessary to weld back a sheet thereto as was done in the case of the impact test piece.

The impact test piece was placed on a load cell with its longitudinal direction oriented vertically. A 120 kg plumb bob was dropped onto the upper end of the impact test piece from a height of 9 m and the absorbed impact energy up to 50 mm deformation of the impact test piece in the longitudinal direction was determined. Specifically, the deformation of the test piece was constantly measured with a laser displacement sensor while the load acting on the test piece was constantly and simultaneously measured by the load cell. The cumulative absorbed energy calculated by integrating the load at all time points over the range of deformation, from the instant the plumb bob struck the impact test piece until the impact test piece had deformed 50 mm in the longitudinal direction, was defined as the absorbed impact energy.

Bending impact test pieces were prepared in the same manner as the aforesaid impact test pieces, with the sole exception of being made to a different length of 600 mm.

Two same-type support points with load cells were placed on a horizontal plane at 500 mm spacing and a bending impact test piece was placed thereon with its longitudinal direction oriented horizontally and back sheet on the underside. A three-point falling weight bending test was conducted by dropping a 75 kg plumb bob onto the longitudinal center of the bending impact test piece from a height of 9 m and the absorbed impact energy up to 50 mm deformation of the longitudinal middle of the bending impact test piece was determined. Specifically, the deformation of the test piece was constantly measured with a laser displacement sensor while the load acting on the test piece was constantly and simultaneously measured by the two load cells. The cumulative absorbed energy calculated by integrating the total load on the two load cells at all time points over the range of deformation, from the instant the plumb bob struck the impact test piece until the impact test piece had bent and deformed 50 mm in the vertical direction, was defined as the absorbed impact energy.

As a result, it was found that in both the test using the impact test piece and the test using the bending impact test piece, the absorbed impact energy was greater and the impact-absorption property improved in proportion as the hardness (strength) of the vertical walls of the hat viewed in cross-section was higher.

To evaluate flange cuttability, the test piece was cut with a shearing machine whose flywheel was initially rotating at a prescribed rpm. Upon completion of the cutting, the amount of electric power the motor consumed to restore the shearing machine flywheel to the prescribed rpm starting from immediately after cutting was determined, and the determined power consumption was divided by the sectional area of the test piece cut. A larger value by this calculation was judged to signify poorer shear property. The reasoning was that higher power consumption for cutting indicates severer shear blade wear and lower productivity.

It was thus found that power consumption per unit sectional area during shearing is a simple function of flange hardness (strength), so that power consumption declines and shear property improves as hardness is lower. In other words, since impact-absorption property and shear property are related as shown in FIG. 1, it is desirable for vertical wall hardness to be high and flange hardness to be low.

A study was therefore conducted using various austenitic stainless steel sheets and stainless steel sheets comprising an austenite phase content of 20 vol % or greater and the balance of ferrite phase. Specifically, hat-shapes were fabricated under various cold processing conditions and the hardness at the center regions of the vertical walls and the hardness at the distal ends of the flanges were investigated. It was found that by limitation to specified conditions, the hardness of the vertical walls could be made markedly higher than that of the flanges.

Sheets A, B and C, all of 1 mm thickness, were prepared such that, prior to shaping, the microstructure of sheet A was composed substantially 100% of austenite phase, that of sheet B was a mixed structure comprising 18 vol % of austenite phase and the balance of martensite phase and unavoidable precipitated phases, and that of sheet C was a mixed structure comprising 30 vol % of austenite phase and the balance of ferrite phase and unavoidable precipitated phases.

Grid patterns of 5 mm pitch were printed on the surfaces of the sheet A and the sheet B so the strain distribution after processing could be checked. The sheets were processed into hat-like shapes under different degrees of wrinkle suppressing force during press-forming so as to vary the strain of the vertical walls. The strain and hardness at the center regions of the vertical walls and the distal ends of the flanges were examined. The results are shown in FIG. 2, in which the horizontal axis is scaled for strain at the center regions of the vertical walls and the vertical axis is scaled for difference ΔHv between vertical wall hardness and flange hardness.

With the sheet A, difference ΔHv increased with increasing strain of the vertical walls, such that Vickers hardness of the vertical walls became higher than that of the flanges by 170 or greater. With the sheet B, on the other hand, the margin of hardness increase with increase in vertical wall strain was smaller than that of the sheet A, while the difference between the hardnesses of the vertical walls and flanges was small and breakage occurred during shaping when strain at the center regions of the vertical walls exceeded 30%. With the sheet C, as with the sheet A, difference ΔHv increased with increasing strain of the vertical wall, with the Vickers hardness of the vertical wall becoming higher than that of the flanges by 150 or greater. In the cases of sheets A and C, when tension imparted to the vertical wall during press-forming caused elongation strain to exceed 8%, strengthening occurred owing to the generation of 10 vol % or greater of deformation-induced martensite.

The fact that austenite phase is paramagnetic and ferrite phase and martensite phase are ferromagnetic was used to measure the ferrite phase and martensite phase contents of the distal ends of the flanges and the center regions of the vertical walls in vol % by means of an apparatus for measuring ferrite phase content and martensite phase from difference in magnetic properties. This method is incapable of distinguishing between ferrite phase and martensite phase. However, when ferrite phase and martensite phase contents are increased by cold processing, the increased ferrite phase content does not remain as ferrite phase but all becomes newly generated deformation-induced martensite content (vol %), so that austenite phase content decreases by the same amount (vol %).

The present invention was accomplished based on the foregoing knowledge. The essence of the present invention is as set out in the following.

(1) A structural component for an automobile, two-wheeled vehicle or railcar excellent in impact-absorption property, shape fixability and flange cuttability that is produced by processing a steel sheet containing austenite phase and a balance of ferrite phase and/or martensite phase and unavoidable precipitated phases, which structural component comprises vertical walls and flanges, wherein distal ends of the flanges contain 20 vol % or greater of austenite phase and have a cross-section hardness expressed as Vickers harness of 150~350, and center regions of the vertical walls have, in a common cross-section with the flanges, a content of deformation-induced martensite phase exceeding that of the distal ends of the flanges by 10 vol % or greater and a cross-section hardness expressed as Vickers hardness that exceeds that of the distal ends of the flanges by 50 or greater.

(2) A structural component for an automobile, two-wheeled vehicle or railcar excellent in impact-absorption property, shape fixability and flange cuttability according to (1), wherein the steel sheet comprises, in mass %, C: 0.001~0.250%, Si: 0.01~3.00%, Mn: 0.01~10.00%, P: less than 0.050%, S: 0.0001~0.0100%, Cr: 5.0~30.0%, Ni: 0.03~15.00%, N: 0.001~0.300% and a balance of Fe and unavoidable impurities.

(3) A structural component for an automobile, two-wheeled vehicle or railcar excellent in impact-absorption property, shape fixability and flange cuttability according to (1) or (2), wherein the steel sheet further comprises, in mass %, one or more of Cu: 0.10~5.00%, Mo: 0.10~5.00%, W: 0.10~5.00%, V: 0.10~5.00%, Ti: 0.005~0.500%, Nb: 0.005~0.500%, B: 0.0003~0.0050%, Al: 0.003~0.500%, Mg: 0.0001~0.0050%, and Ca: 0.0001~0.0050%.

(4) A method of producing a structural component for an automobile, two-wheeled vehicle or railcar excellent in impact-absorption property, shape fixability and flange cuttability, comprising:

fabricating a structural component set out in any of (1) to (3) by press-forming to produce strain of 8% to 40% at the center regions of the vertical walls.

(5) A method of producing a structural component for an automobile, two-wheeled vehicle or railcar excellent in impact-absorption property, shape fixability and flange cuttability according to (4), wherein fabrication of the structural component by press-forming is conducted at a punch temperature lower than a die temperature by 10° C. or greater.

DETAILED DESCRIPTION OF THE INVENTION

The reason for the limitations defined by the present invention are explained below.

Structural Component

Figure 3:
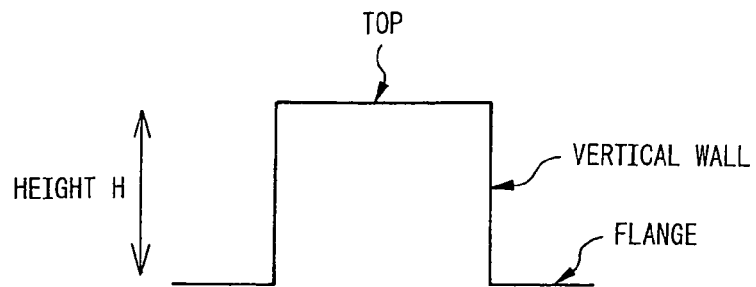
FIG. 3 is a set of diagrams showing hat shapes.
Figure 3:
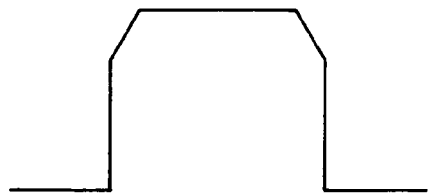
Figure 3:
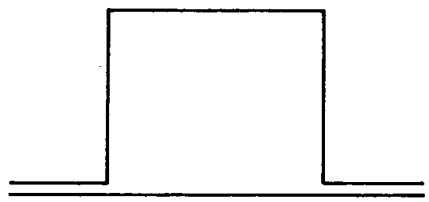

The present invention relates to a structural component having a hat-like shape in cross section. As shown in FIG. 3(a), the hat-like shape of the present invention includes flanges, vertical walls and a top. Possible cross-sectional configurations include ones of polygonal shape like that shown in FIG. 3(b), ones in which a back sheet is attached to the flanges by welding or the like as shown in FIG. 3(c), and ones in which a bead or the like is present on the flanges or the vertical walls.

Cross-Section Hardness

The cross-section hardness Hvw at the center regions of the vertical walls is characterized in being greater than the cross-section hardness Hvf at the distal ends of the flanges by 50 or greater expressed as Vickers hardness. When the cross-section hardness difference ΔHv=Hvw−Hvf is less than 50 as Vickers hardness, adequate impact-absorption property and flange cuttability cannot be simultaneously achieved. When a steel sheet not containing austenite phase is used, the difference in cross-section hardness between the center regions of the vertical walls and the distal ends of the flanges after shaping is ordinarily small, i.e., less than 20 as Vickers hardness, so that the impact-absorption property and the flange cuttability are not in good balance.

Figure 1:
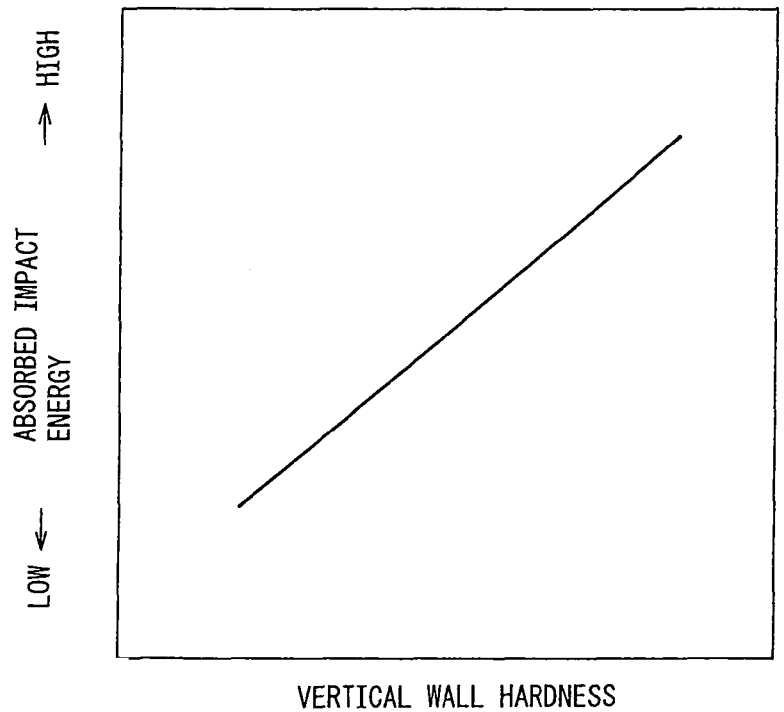
FIG. 1 is a set of diagrams schematically showing how absorbed impact energy varies with vertical wall hardness and how flange shear property varies with flange hardness.
Figure 1:
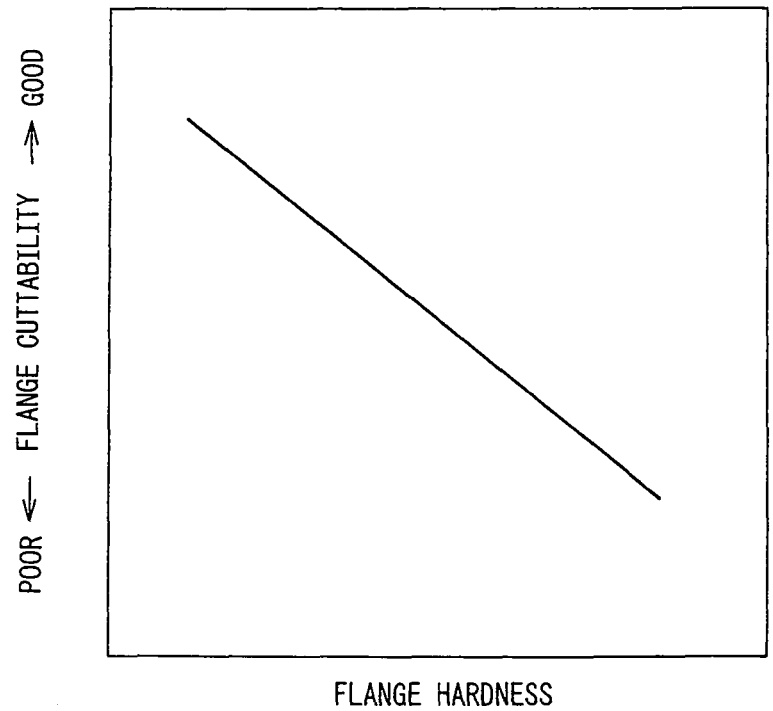
Figure 2:
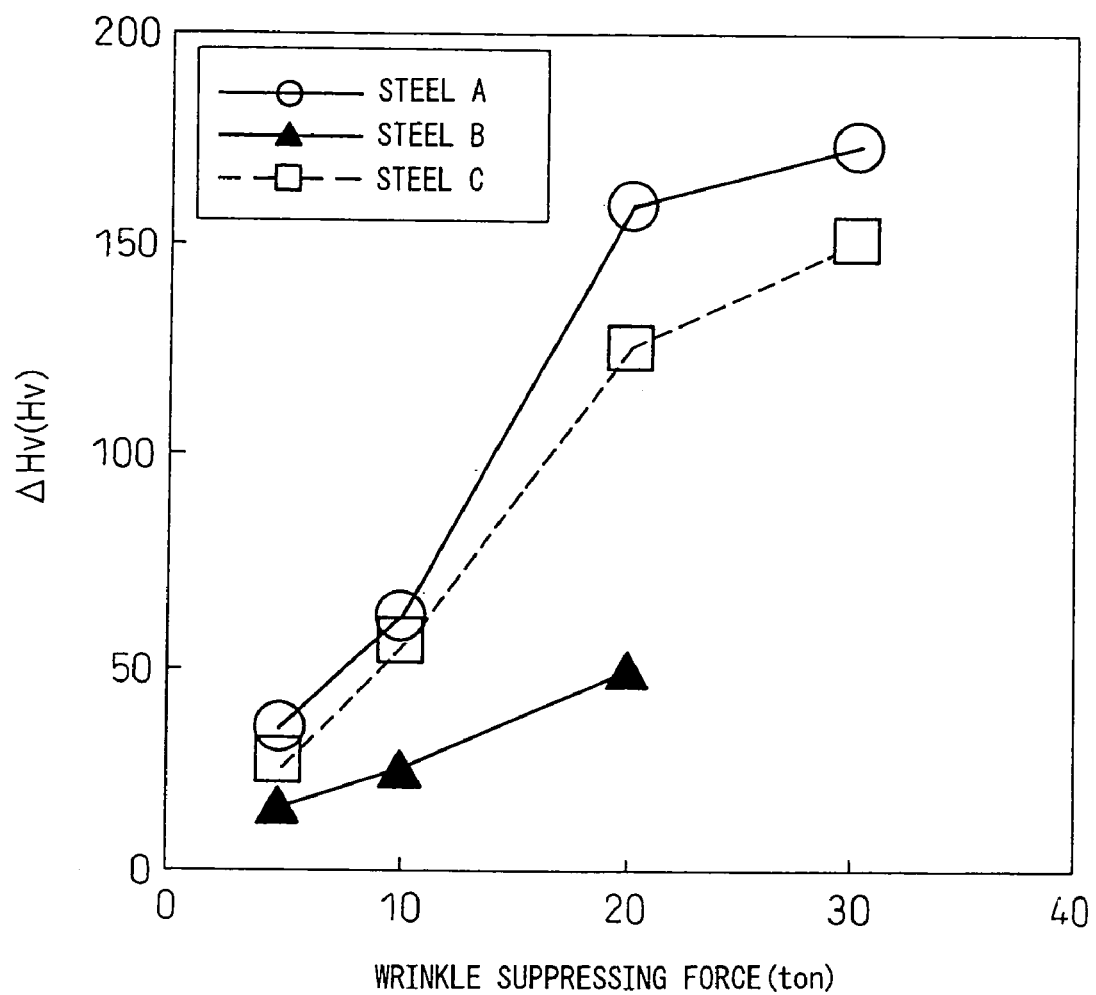
FIG. 2 is a diagram showing how ΔHv varies with wrinkle suppressing force.

In the present invention, however, the regions that contribute to the two properties (the center regions of the vertical walls and the distal ends of the flanges) are specified and the two are made to have a large Vickers hardness difference of 50 or greater, thereby enabling enlargement of the horizontal axis value in FIG. 1(a) while maintaining the horizontal axis value in FIG. 1(b) small. In other words, the impact-absorption property and the flange cuttability can both be favorably established. The center regions of the vertical walls are at ½ the height H shown in FIG. 3(a). The distal ends of the flanges are zones extending approximately 2 mm inward from the outer edge of each flange. Cross-section hardness is measured by embedding a member formed to have a hat-like shape while maintaining its shape unchanged, mechanically polishing and electrolytically polishing to a depth of 5 mm in the center direction, and then conducting measurement in accordance with JIS Z 2244 at the center regions of the vertical walls and the distal end of the flange. The cross-section hardness of the distal end of the flange at this time is defined as Vickers hardness of 150~350. This is because adequate impact-absorption property cannot be obtained at a value of less than 150, and when the value exceeds 350, the flange cuttability is markedly inferior.

Austenite Phase Content

Austenite phase increases strength by undergoing deformation-induced martensite transformation during cold shaping. The austenite phase content is therefore an important parameter in the present invention. The lower limit of austenite content is defined as 20 vol % because the post-shaping vertical wall strength (hardness) increases greatly at a content of 20 vol % or greater. No upper limit is defined because metastable austenitic stainless steel has an austenite content of 100%. The balance is defined as consisting of ferrite phase and/or martensite phase and unavoidable precipitated phases.

The present invention encompasses both the case where the microstructure of the distal ends of the flanges contains 20 vol % or greater of austenite phase and the balance of ferrite phase and/or martensite phase and unavoidable precipitated phases and the case where it contains austenite phase and the balance of unavoidable precipitated phases.

On the other hand, the sectional microstructure at the center regions of the vertical walls have a deformation-induced martensite phase content that exceeds that of the distal ends of the flange in the same cross-section of the hat shape by 10 vol % or greater and is lower in austenite content in proportion, so that the Vickers hardness difference between the center regions of the vertical walls and the distal ends of the flanges can be made 50 or greater.

Sheet Thickness

The sheet thickness is defined as 0.8~4.0 mm. Impact-absorption property is inadequate when the thickness is less than 0.8 mm, so this value is set as the lower limit. The upper limit of thickness is defined as 4.0 mm because at greater than this level, the high load arising during shaping puts a heavy burden on the press and other equipment, exposing them to the risk of damage.

Steel Sheet Composition

C content is assigned an upper limit of 0.250% because addition of a large amount of C sometimes degrades corrosion resistance. The lower limit is set at 0.001% taking into account the decarburization load during refining. The preferable range for stable production is 0.005~0.080%.

Si content is assigned an upper limit of 3.00% because addition of a large amount of Si causes edge cracking and increases rolling load during production. The lower limit is set at 0.01% taking into account incorporation at the steel-making stage.

Mn, like Si, at high content causes edge cracking during production. In addition, it precipitates Mn-base inclusions that degrade corrosion resistance. The upper limit of Mn content is therefore defined as 10.00%. The lower limit is defined as 0.01%, a level of reduction that can be achieved without incurring a heavy load at the refining stage.

P degrades workability at high content. Its content is therefore defined as less than 0.050%. P content is more preferably less than 0.040%.

S when heavily present produces sulfides that act as corrosion starting points, so the content thereof is preferably as low as possible. The upper limit is defined as 0.0100%. Even though the minimum achievable content is preferable, the lower limit is defined as 0.0001% taking into account the desulfurization load at the refining stage.

Cr improves corrosion resistance. It also plays an important role with regard to producing deformation-induced martensite transformation like that in the present invention. From this viewpoint, the lower limit of Cr is defined as 5.0%. The upper limit is defined as 30.0% because when added in a larger amount, Cr generates intermetallic compounds that cause edge cracking during production.

Ni, like Cr, plays an important role in microstructure control. Since addition of Ni improves toughness, the lower content limit is defined as 0.03%. The upper limit is set at 15.00% because heavier addition increases the steel strength excessively and also raises cost.

N concentrates in γ phase at high temperature, thus playing an important role in regulating γ phase ratio and stability of the γ phase. It also improves corrosion resistance. The lower limit is defined as 0.001%. However, heavy N addition causes hardening that leads to cracking during production and also greatly increases production cost owing to the need to use pressurizing equipment and the like for the addition. The upper limit of N content is therefore set at 0.300%.

Selective addition of the following elements is allowable.

Cu, Mo, W and V improve corrosion resistance. For this purpose, they can be added individually or in combinations of two or more. As the improvement effect is observed at a content of 0.10% or greater, this value is set as the lower limit. The upper limit is defined as 5.00% because heavier addition causes production defects by increasing rolling load during production.

Ti, Nb and B improve formability. One or a combination of two or more thereof can be added as required. As the formability improvement effect is observed at a content of or greater than Ti: 0.005%, Nb: 0.005% and B: 0.0003%, these values are defined as the lower limits. Heavy addition causes production defects and degrades hot workability, so the upper content limits are set at Ti: 0.500%, Nb: 0.500% and B: 0.0050%.

Al, Mg and Ca may be added for the purpose of deoxidation and desulfurization during refining. As these effects are observed at a content of Al: 0.003%, Mg: 0.0001% and Ca: 0.0001%, these values are defined as the lower limits. Heavy addition causes production defects and increase raw material cost, so the upper content limits are set at Al: 0.500%, Mg: 0.0050% and Ca: 0.0050%.

The reason for the limits set by the present invention regarding the shaping method are explained in the following.

Elongation Strain of Center Regions of the Vertical Walls:

The elongation strain of the center regions of the vertical walls is a key condition determining the shape and strength (hardness) of the formed structural component. An elongation strain of 8% to 40% is required. When the elongation strain is less than 8%, the amount of deformation-induced martensite phase generated in the vertical walls is small, so that no increase in vertical wall strength is observed and, what is more, the shape fixability of the shaped component is insufficient. When the elongation strain exceeds 40%, the vertical walls sometimes break in the course of shaping.

Shaping Temperature:

The punch and die temperatures are preferably controlled during shaping. The punch temperature Tp is preferably lower than the die temperature by 10° C. or greater. The ease with which deformation-induced martensite transformation occurs, as in the present invention, is highly dependent on temperature. It is preferable for the punch to force the metal into the die at a low punch temperature so as to promote deformation-induced martensite transformation and for the die to suppress deformation-induced martensite transformation before metal inflow. The temperature difference is preferably 10° C. or greater, because under this condition there can be realized good impact-absorption property and shape fixability as well as satisfactory flange cuttability.

EXAMPLE 1

The invention is concretely explained with reference to examples in the following. Steel sheets (2.0 mm thickness) of the chemical compositions shown in Table 1 were shaped into hat-shapes at room temperature under various shaping conditions. A forming test was conducted under the following conditions:

Sample size: 50 mm×260 mm

Punch: Angular, Width=80 mm, Chamfer (R)=5 mm

Die: Angular, Width=85 mm, Chamfer (R)=5 mm

Wrinkle suppressing force: Varied as necessary

Forming height: 40 mm

Figure 4:
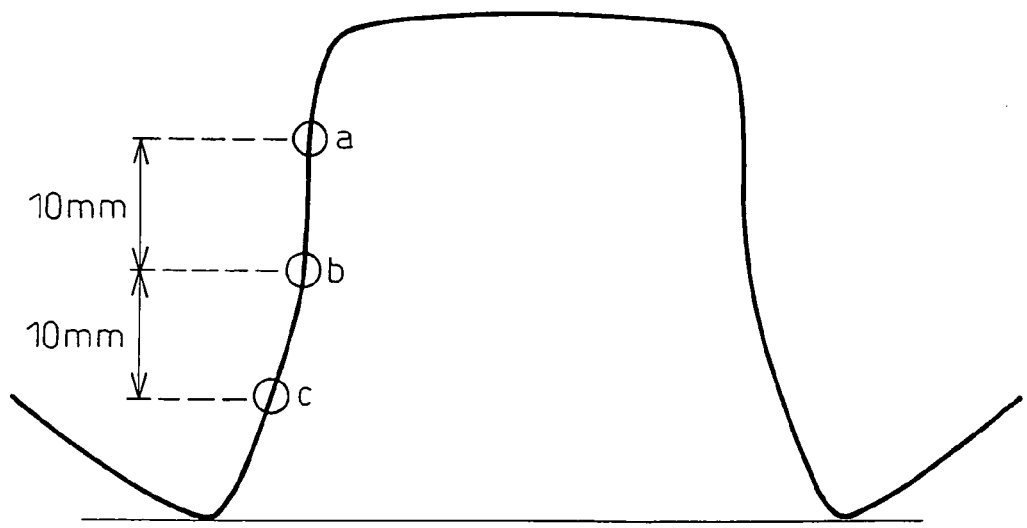
FIG. 4 is a diagram showing measurement locations of wall warping of a hat-shaped sample.

Lubricant: Petroleum lubricant producing coefficient of dynamic friction of about 0.15 applied to both sides of steel sheet The difference ΔHv between the hardnesses of the vertical wall center regions and the distal ends of the flanges of each formed sample was examined. The difference ΔHv in cross-section hardness was measured by the method explained earlier. Shape fixability was determined by measuring the shape of the obtained hat-shape sample with a 3-dimensional shape analyzer and, the curvature of the vertical walls was determined from the points a, b and c shown in FIG. 4 as the "wall warp: 1/ρ". Point b corresponds to point of ½ total height where a line connecting opposite sides of the sample hat brim is defined as the bottom, and points a and c are located 10 mm above and below the point b. The wall warp is the reciprocal of the radius (mm) of the circle passing through the points a, b and c. A smaller value of the wall warp indicates better shape fixability. It was found that shape fixability was sufficient at a 1/ρ value of less than 0.005.

The results are shown in Table 2. In the hat-shapes according to the present invention, the center regions of the vertical walls had a Vickers cross-section hardness exceeding that of the distal ends of the flanges by 50 or greater (ΔHv≧50) and 1/ρ was small. In other words, the effect of the present invention was observed in the excellent crash absorption property, flange cuttability and shape fixability.

TABLE 1

| Steel | C | Si | Mn | P | S | Ni | Cr | N | Cu | Mo | W | V |
|---|---|---|---|---|---|---|---|---|---|---|---|---|
| A | 0.128 | 2.41 | 0.55 | 0.014 | 0.0049 | 10.70 | 27.1 | 0.009 | | | | 2.10 |
| B | 0.046 | 0.75 | 0.99 | 0.019 | 0.0005 | 12.10 | 18.1 | 0.006 | | 2.11 | | |
| C | 0.009 | 0.48 | 0.65 | 0.038 | 0.0011 | 6.30 | 24.1 | 0.150 | | 3.60 | | |
| D | 0.011 | 0.87 | 3.21 | 0.037 | 0.0002 | 6.80 | 16.5 | 0.015 | 2.30 | | | |
| E | 0.081 | 0.34 | 0.34 | 0.028 | 0.0012 | 0.33 | 21.4 | 0.200 | 0.35 | | | |
| F | 0.110 | 0.09 | 1.30 | 0.030 | 0.0066 | 0.90 | 6.8 | 0.056 | 0.40 | | 2.80 | |
| G | 0.005 | 1.55 | 0.35 | 0.021 | 0.0003 | 2.45 | 17.6 | 0.090 | 2.44 | 0.15 | | |
| H | 0.043 | 0.51 | 1.01 | 0.028 | 0.0003 | 7.98 | 18.0 | 0.041 | 0.15 | 0.10 | | 0.14 |
| I | 0.016 | 0.72 | 7.11 | 0.036 | 0.0002 | 3.50 | 24.1 | 0.121 | | | 1.35 | |
| J | 0.210 | 0.45 | 0.87 | 0.033 | 0.0010 | 7.01 | 17.0 | 0.002 | | | | |
| K | 0.034 | 0.87 | 0.50 | 0.029 | 0.0012 | 7.10 | 17.1 | 0.210 | | | 0.11 | |
| L | 0.080 | 0.25 | 1.32 | 0.022 | 0.0018 | 19.0 | 3.5 | 0.130 | | 3.20 | | |
| M | 0.030 | 0.21 | 2.95 | 0.031 | 0.0012 | 1.5 | 20.9 | 0.096 | 0.31 | | | |
| N | 0.015 | 0.08 | 2.50 | 0.025 | 0.0025 | 1.2 | 21.2 | 0.141 | | | | |
| O | 0.023 | 0.54 | 1.04 | 0.027 | 0.0009 | 7.0 | 17.1 | 0.120 | 0.21 | 0.15 | | |
| P | 0.110 | 0.60 | 0.82 | 0.030 | 0.0011 | 6.8 | 17.1 | 0.018 | 0.23 | 0.14 | | |

| Steel | Ti | Nb | B | Al | Mg | Ca | |
|---|---|---|---|---|---|---|---|
| A | 0.250 | | | | 0.067 | 0.0024 | Invention |
| B | | | | | | 0.0003 | Invention |
| C | | | 0.0005 | 0.410 | | | Invention |
| D | | | | 0.004 | | 0.0002 | Invention |
| E | 0.130 | | 0.0044 | | 0.0001 | | Invention |
| F | 0.010 | 0.470 | | | | | Invention |
| G | | 0.035 | 0.0014 | | | | Invention |
| H | | | | | | | Invention |
| I | | 0.120 | | | | 0.0036 | Invention |
| J | | | | | | | Invention |
| K | | | | 0.004 | | | Invention |
| L | | | | 0.110 | | | Comparative |
| M | | | | 0.035 | | | Invention |
| N | | | | | | | Invention |
| O | | | | 0.019 | | | Invention |
| P | | | | 0.002 | | | Invention |

TABLE 2

| Steel | Flange austenite phase ratio (%) | Flange ferrite + martensite phase ratio (%) | Vertical wall ferrite + martensite phase ratio (%) | Vertical wall center region strain (%) | Formable? | Vertical wall ΔHv (Hv) | Wall warp 1/ρ (1/mm) | |
|---|---|---|---|---|---|---|---|---|
| A | 75 | 25 | 39 | 8 | Yes | 75 | 0.003 | Invention |
| B | 98 | 2 | 25 | 11 | Yes | 100 | 0.0025 | Invention |
| C | 28 | 72 | 83 | 10 | Yes | 68 | 0.0015 | Invention |
| D | 100 | 0 | 19 | 12 | Yes | 84 | 0.0018 | Invention |
| E | 65 | 35 | 50 | 18 | Yes | 68 | 0.0029 | Invention |
| F | 100 | 0 | 11 | 34 | Yes | 154 | 0.0018 | Invention |
| G | 95 | 5 | 41 | 9 | Yes | 100 | 0.0019 | Invention |
| H | 86 | 14 | 48 | 21 | Yes | 159 | 0.0009 | Invention |
| I | 53 | 47 | 59 | 18 | Yes | 69 | 0.0024 | Invention |
| J | 100 | 0 | 17 | 9 | Yes | 199 | 0.0008 | Invention |
| K | 98 | 2 | 38 | 14 | Yes | 165 | 0.0035 | Invention |
| L | 100 | 0 | 2 | 15 | Yes | 45 | 0.0062 | Comparative |
| M | 33 | 67 | 81 | 19 | Yes | 73 | 0.0019 | Invention |
| N | 41 | 59 | 73 | 13 | Yes | 66 | 0.0025 | Invention |
| O | 100 | 0 | 24 | 19 | Yes | 112 | 0.0012 | Invention |
| P | 100 | 0 | 26 | 21 | Yes | 100 | 0.0013 | Invention |

The austenite phase ratio (%) in Table 2 is the vol % of austenite phase of ends of the flanges and the balance is ferrite phase and/or martensite phase and unavoidable precipitated phases.

The fact that austenite phase is paramagnetic and ferrite phase and martensite phase are ferromagnetic was used to measure the ferrite phase and martensite phase contents of the center regions of the vertical walls in vol % by means of an apparatus for measuring ferrite phase content and martensite phase from difference in magnetic properties. Regarding the values in Table 2, in the phenomenon of ferrite phase and martensite phase contents being increased by cold processing, all derives from newly generated deformation-induced martensite phase, and austenite phase decreases by the same amount (vol %). Further, cross-sectional specimens for light microscope observation! sampled from the respective regions were prepared by embedding in resin, mechanical polishing, electrolytic polishing and aqua regia etching, whereafter they were subjected to light microscope observation using the point counting method. The results obtained were substantially the same as the measurement results obtained using the aforesaid apparatus for measuring ferrite phase and martensite phase contents. In addition, the amount of unavoidable impurities was found to be less than 0.5 vol % in all specimens.

The Vickers hardnesses shown in Table 2 were all measured at the center of sheet-thickness using cross-sectional specimens for optical microscope observation, by a method in conformity with JIS Z 2244. The cross-section hardnesses of the distal ends of the flanges were all Vickers hardnesses of 150~350, and the center regions of the vertical walls had deformation-induced martensite phase contents that exceeded those of the distal ends of the flanges in the same cross-section by 10 vol % or greater.

EXAMPLE 2

The foregoing forming test was carried out on Steel H and Steel K of Table 1 under various forming temperatures. The difference ΔHv between the hardnesses of the vertical wall center regions and the distal ends of the flanges of each sample was examined. The shape fixability was also investigated.

The results are shown in Table 3. In all of Steels H, K and M, it was found that the hardness difference ΔHv between the center regions of the vertical walls and the distal ends of the flanges increased with increasing difference ΔT between the punch temperature Tp and the die temperature Td (ΔT=Td−Tp), and that when the punch temperature was lower than the die temperature by 10° C. or greater, the hardness difference was ΔHv≧50.

aforesaid apparatus for measuring ferrite phase and martensite phase contents. In addition, the amount of unavoidable impurities was found to be less than 0.5 vol % in all specimens.

The Vickers hardnesses shown in Table 3 were all measured at the center of sheet-thickness using cross-sectional specimens for optical microscope observation, by a method in conformity with JIS Z 2244. The cross-section hardnesses of the distal ends of the flanges were all Vickers hardnesses of 150~350, and the center regions of the vertical walls had deformation-induced martensite phase contents that exceeded those of the distal ends of the flange in the same cross-section by 10 vol % or greater.

INDUSTRIAL APPLICABILITY

The present invention provides a structural component for an automobile, two-wheeled vehicle or railcar excellent in impact-absorption property, shape fixability and flange cuttability, and method for producing the same, and therefore makes a considerable contribution to, for example, weight reduction of automobiles and the like as well as to reduction of environmental load.

What is claimed is:

1. A structural component for an automobile, two-wheeled vehicle or railcar excellent in impact-absorption property, shape fixability and flange cuttability that is produced by processing a steel sheet containing austenite phase and a balance of ferrite phase and/or martensite phase and unavoid-

TABLE 3

| Steel | Flange austenite phase ratio (%) | Flange ferrite + martensite phase ratio (%) | Vertical wall ferrite + martensite phase ratio (%) | Vertical wall center region strain (%) | Punch temp Tp (° C.) | Die temp. Td (° C.) | Temp difference ΔT (° C.) | Hardness difference ΔHv (Hv) | Wall warp 1/ρ (1/mm) |
|---|---|---|---|---|---|---|---|---|---|
| H | 85 | 15 | 38 | 10 | −26 | 10 | 36 | 128 | 0.0020 |
| H | 100 | 0 | 21 | 10 | 0 | 25 | 25 | 104 | 0.0025 |
| H | 90 | 10 | 23 | 10 | 0 | 10 | 10 | 89 | 0.0026 |
| K | 80 | 20 | 49 | 13 | −26 | 10 | 36 | 137 | 0.0018 |
| K | 89 | 11 | 35 | 13 | 0 | 25 | 25 | 127 | 0.0019 |
| K | 80 | 20 | 35 | 13 | 0 | 10 | 10 | 122 | 0.0022 |
| M | 33 | 67 | 88 | 15 | −26 | 10 | 36 | 122 | 0.0021 |
| M | 35 | 65 | 83 | 15 | 0 | 25 | 25 | 99 | 0.0024 |
| M | 40 | 60 | 73 | 15 | 0 | 10 | 10 | 76 | 0.0027 |

The austenite phase ratio (%) in Table 3 is the vol % of austenite phase of the distal ends of the flanges and the balance is ferrite phase and/or martensite phase and unavoidable precipitated phases.

The fact that austenite phase is paramagnetic and ferrite phase and martensite phase are ferromagnetic was used to measure the ferrite phase and martensite phase contents of the center regions of the vertical walls in vol % by means of an apparatus for measuring ferrite phase content and martensite phase from difference in magnetic properties. Regarding the values in Table 3, in the phenomenon of ferrite phase and martensite phase contents being increased by cold processing, all derives from newly generated deformation-induced martensite phase, and austenite phase decreases by the same amount (vol %). Further, cross-sectional specimens for light microscope observation sampled from the respective regions were prepared by embedding in resin, mechanical polishing, electrolytic polishing and aqua regia etching, whereafter they were subjected to light microscope observation using the point counting method. The results obtained were substantially the same as the measurement results obtained using the able precipitated phases, which structural component is fabricated to have a hat-like shape including a top, vertical walls and flanges, wherein distal ends of the flanges contain 20 vol % or greater of austenite phase and have a cross-section hardness expressed as Vickers hardness of 150~350, center regions of the vertical walls have, in a common cross-section with the flanges, a content of deformation-induced martensite phase exceeding that of the distal ends of the flanges by 10 vol % or greater and a cross-section hardness expressed as Vickers hardness that exceeds that of the distal ends of the flanges by 50 or greater, and wherein the steel sheet comprises, in mass %, C: 0.001~0.250%,
Si: 0.01~3.00%,
Mn: 0.01~10.00%,
P: less than 0.050%,
S: 0.0001~0.0100%,
Cr: 5.0~30.0%, Ni: 0.03~15.00%,
N: 0.001~0.300%, and
a balance of Fe and unavoidable impurities.

2. A structural component for an automobile, two-wheeled vehicle or railcar excellent in impact-absorption property, shape fixability and flange cuttability according to claim 1, wherein the steel sheet further comprises, in mass %, one or more of Cu: 0.10~5.00%,
Mo: 0.10~5.00%,
W: 0.10~5.00%,
V: 0.10~5.00%,
Ti: 0.005~0.500%,
Nb: 0.005~0.500%,
B: 0.0003~0.0050%,
Al: 0.003~0.500%,
Mg: 0.0001~0.0050%, and
Ca: 0.0001~0.0050%.

3. A method of producing a structural component for an automobile, two-wheeled vehicle or railcar excellent in impact-absorption property, shape fixability and flange cuttability, comprising:

producing a structural component according to claim 1 or claim 2 by press-forming a steel sheet containing austenite phase and a balance of ferrite phase and/or martensite phase and unavoidable precipitated phases to produce strain of 8% to 40% at the center regions of the vertical walls.

4. A method of producing a structural component for an automobile, two-wheeled vehicle or railcar excellent in impact-absorption property, shape fixability and flange cuttability according to claim 3, wherein fabrication of the structural component by press-forming is conducted at a punch temperature lower than a die temperature by 10° C. or greater.

* * * * *